Patented Dec. 29, 1942

2,306,415

UNITED STATES PATENT OFFICE 2,306,415

CHEWING GUM

Charles C. Walker, Groveland, Fla., assignor to John W. Glenn, Buffalo, N. Y.

No Drawing. Application August 19, 1939, Serial No. 291,081

3 Claims. (Cl. 99—135)

This invention relates to chewing gum, and more particularly to a chewing gum which is chocolate flavored.

Previous attempts to manufacture a satisfactory uniform failure, since if sufficient chocolate flavoring is added to the usual gum, the product loses ing is added to the usual gum, the product loses the desirable chewiness characteristic of good gum. Chocolate possesses the property of breaking down the base of the ordinary gum, and it is for this reason that it has been found impossible to incorporate sufficient chocolate in a chewing gum to give it a definite chocolate flavor.

Attempts have been made to incorporate chocolate in a latex base gum. In this type of gum the chocolate serves as a modifier together with other materials in order to break down the toughness of the latex. It has been found impossible to add sufficient chocolate in order to get a definite chocolate flavor and still retain a satisfactory chewable gum.

An object of this invention is to produce a chewing gum having a definite chocolate flavor, and possessing desirable chewing characteristics.

Another object of the invention is to produce a satisfactory chewing gum having a chocolate flavor impregnated therethrough.

A still further object is to produce a chocolate coated chewing gum, the coating of which will flavor the gum when chewed without deleterious effect on the chewing properties of the gum.

Other objects and the nature and advantages of the invention will be apparent from the following description.

First I wash, filter, and sterilize by steam, all in the usual manner, a suitable amount, for example five pounds of perillo chicle. I then pass the treated chicle between rollers to squeeze out and extract the major portion of the moisture content therein.

I add the chicle to a kettle containing eight pounds of corn syrup which has been cooked at a temperature of approximately 245 degrees Fahrenheit for a short time. I mix the chicle and corn syrup well, preferably in a mixer, simultaneously adding two pounds of cacao liquor (bitter chocolate) and ten to fifteen pounds of sugar, preferably cane sugar.

The remainder of the sugar, twenty-eight pounds in all is then added, together with such other flavors as desired, such as peppermint, spearmint, wintergreen, cloves, cinnamon, or synthetic flavors.

The resulting mass is thoroughly mixed to produce a homogeneous product, then removed from the mixer and placed on a suitable support, where it is rolled, pressed, cut, or scored into the desired size and shape, usually balls, sticks, or tablets.

The formed gum may be given a chocolate coating if desired. This is accomplished by placing the gum in a revolving pan or other container located in a relatively cool room, sixty-five degrees Fahrenheit or less, and adding sufficient chocolate to fully cover and coat the gum. The chocolate coating may be polished in any well known manner, such as by use of a liquid made of sugar, gum arabic, and water.

I have described above the chocolate coating of chocolate flavored gum. Without departing from the spirit of my invention, the chocolate coating may be omitted from the chocolate flavored gum, or the gum may be made without chocolate, and a chocolate coating added. The chocolate coating will serve to preserve the gum in a fresh condition for a long time, and, upon being chewed, the chocolate will flavor the entire gum without adversely affecting the chewing qualities of the gum as made above. A gum made as outlined above is peculiarly adapted to withstand the ordinarily harmful effects of chocolate, producing a perfect chewing chocolate flavored gum.

It will be obvious to those skilled in the art that various slight changes may be made in the proportions of the ingredients, or other changes made without departing from the spirit of the invention, and therefore the invention is not limited to what is described in the specification, but only as indicated in the appended claims.

What is claimed is:

1. A chewing gum characterized by its chewiness and comprised of a hard perillo chicle base and cacao liquor, the proportion of said perillo chicle and cacao liquor being in the order of five pounds of perillo chicle to two pounds of cacao liquor, said cacao liquor modifying the characteristics of said hard chicle base to provide a chewable chocolate flavored chewing gum.

2. A chewing gum characterized by its chewiness and comprised of a hard perillo chicle base, cacao liquor and corn syrup, the proportions of said ingredients being in the order of five pounds of perillo chicle, two pounds of cacao liquor and eight pounds of corn syrup, said cacao liquor modifying the characteristics of said hard chicle base to provide a chewable chocolate flavored chewing gum.

3. A chewing gum characterized by its chewiness and comprised of a hard perillo chicle base, cacao liquor, corn syrup and sugar, the proportions of said ingredients being in the order of five pounds of perillo chicle, two pounds of cacao liquor and eight pounds of corn syrup, said cacao liquor modifying the characteristics of said hard chicle base to provide a chewable chocolate flavored chewing gum.

CHARLES C. WALKER.